United States Patent [19]

Meyer-Ebrecht et al.

[11] Patent Number: 4,463,377
[45] Date of Patent: Jul. 31, 1984

[54] ARRANGEMENT FOR STORING OR TRANSMITTING AND FOR RECOVERING PICTURE SIGNALS

[75] Inventors: Dietrich Meyer-Ebrecht; Jens H. Christiansen, both of Hamburg, Fed. Rep. of Germany

[73] Assignee: U.S. Philips Corporation, New York, N.Y.

[21] Appl. No.: 421,610

[22] Filed: Sep. 22, 1982

[30] Foreign Application Priority Data

Sep. 30, 1981 [DE] Fed. Rep. of Germany ....... 3138816

[51] Int. Cl.³ ............................................. H04N 7/12
[52] U.S. Cl. ........................... 358/133; 340/347 DD; 358/260; 358/280; 360/9.1; 364/727
[58] Field of Search ................. 358/133, 138, 13, 260, 358/280; 364/727; 340/347 DD; 360/8, 9.1

[56] References Cited

U.S. PATENT DOCUMENTS

| | | | |
|---|---|---|---|
| 3,775,602 | 11/1973 | Alexandridis | 364/727 |
| 3,956,619 | 5/1976 | Mundy | 364/727 |
| 4,054,909 | 10/1977 | Kojima | 358/13 |
| 4,055,756 | 10/1977 | Jolivet | 364/727 |
| 4,134,134 | 1/1979 | Lux | 358/133 |
| 4,261,043 | 4/1981 | Robinson | 358/133 |

Primary Examiner—Howard W. Britton
Attorney, Agent, or Firm—Jack E. Haken; James J. Cannon, Jr.

[57] ABSTRACT

In the conventional transformation coding of pictures the value ranges of the coefficients then produced are extended during the performance of the individual arithmetical steps. As a result thereof these coefficients have a great redundancy. According to the invention, the arithmetical steps which are formed by the basic transformation of two values are performed so that as a result of each arithmetical step only the original word length is obtained, because in each arithmetical step a portion of the value range of the result is mapped onto a different area. An example for the technical implementation of such a mapping on modified coefficients and the retransformation of these modified coefficients is described.

1 Claim, 5 Drawing Figures

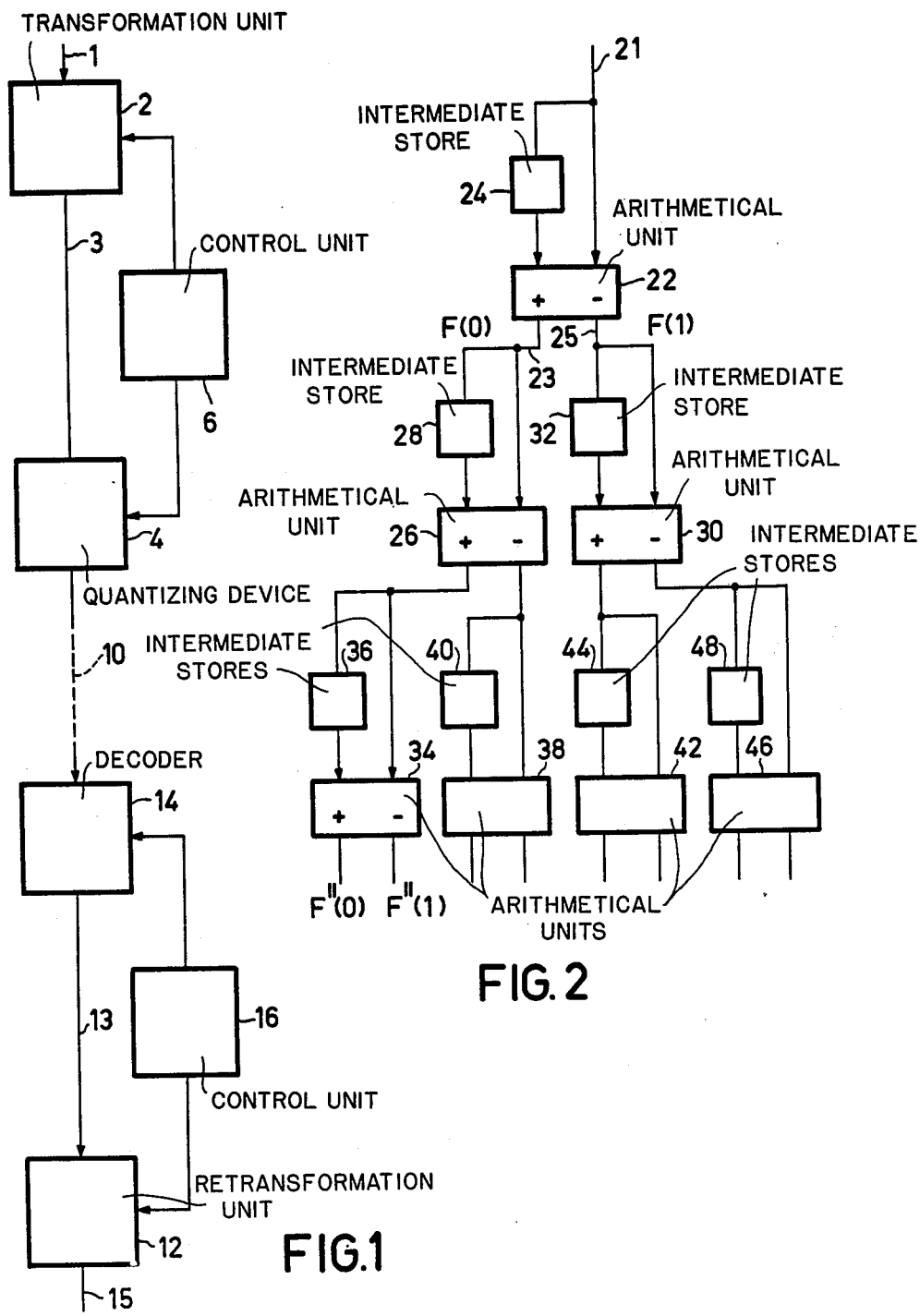

ARRANGEMENT FOR STORING OR TRANSMITTING AND FOR RECOVERING PICTURE SIGNALS

BACKGROUND OF THE INVENTION

1. Field of the Invention

The invention relates to an arrangement for coding and decoding picture element signals (pels), obtained by line by line scanning of the picture elements of a picture, said picture element signals being transformed in a transformation arrangement for generating coefficient values. These coefficient values are quantized in a quantizing device and thereafter stored in a storage medium or transmitted to an associated receiver. For the recovery of the original picture element signals the quantized coefficients are applied to a retransformation arrangement which, as is also the transformation arrangement, is formed by a plurality of transformers $T(i)$ of the order $i$, wherein $i = 1, 2, 3, \ldots N$ and the transformer $T(i)$ having $i$ inputs and $2i$ outputs, the $i$ inputs being connected to the $i$ outputs of the preceding transformer $T(i-1)$. Each transformer $T(i)$ is formed by $i$ auxiliary transformers each having an input connected to the associated output of the preceding transformer $T(i-1)$; this auxiliary transformer also comprises an arithmetical unit having two inputs, one of which is connected directly and the other via a delay device to the input of the auxiliary transformer, the arithmetical unit having two outputs which represent two of the outputs of the transformer $T(i)$.

2. Description of the Prior Art

For the storage or transmission of pictures it is advantageous to use the lowest possible number of information units and yet display the scanned picture as accurately as possible. Reducing the number of information units is possible if in a picture the redundancy and, possibly, also the irrelevance are significantly suppressed. It is known, for example from the periodical "IEEE Transactions on Computers", Vol. Com-19, No. 1, February 1971, pages 50 to 61 inclusive, or from the book by Pratt "Digital Image Processing", John Wiley and Sons, 1978, pages 232 to 278 inclusive, to use transformation coding to reduce the number of information units and to quantize the resultant coefficients. A non-linear characteristic is usually used for the quantization.

After the arithmetical operations are performed in the arithmetical unit, this unit produces an output quantity the value of which is located in a value range which is wider than the range in which the input quantity of the arithmetical unit (and consequently also of the auxiliary transformer) is located. This can be explained with reference to a Walsh-Hadamard-transformation of two picture element signals A and B. The transformation of these two picture element signals produces the two coefficients $$F(1) = A + B$$

$$F(2) = A - B.$$

If now the two picture signals A and B had the maximum value, the coefficient $F(1)$ would be of twice the value, that is to say a doubling of the value range has occurred. Depending on the polarity of A and B this also relates to the coefficient $F(2)$. As the transformation arrangement is formed by a cascade arrangement of a plurality of transformers, doubling of the value range occurring in each transformer, the value range of the transformed signals is wider than the value range of the original picture signals.

SUMMARY OF THE INVENTION

The invention has for its object to provide an arrangement of the type described in the opening paragraph which does not require an increase of the value range of the output quantity produced by the arithmetical units, an advantageous quantization being rendered possible at the same time. According to the invention, each auxiliary transformer includes at least one additional logic circuit to which the carry bit of a first value out of the output values and the sign bit of the second output word of the arithmetical unit are applied to generate an auxiliary bit which is added as the most significant bit to the first output value, the least significant bit and also the carry bit of the first output value and the sign bit of the second output value being suppressed.

The invention utilizes inter alia the fact that the summation and the difference formation result in two numbers which are always either both even or both odd, so that the least significant bit of one of the two output values may be omitted, without information being lost.

BRIEF DESCRIPTION OF THE DRAWINGS

An embodiment of an arrangement in accordance with the invention will now be further described by way of example with reference to the accompanying drawings.

FIG. 1 shows a general block circuit diagram of an arrangement for transforming and retransforming picture signals, FIG. 2 shows a block circuit diagram of a transformation arrangement or a retransformation arrangement.

DESCRIPTION OF THE PREFERRED EMBODIMENT

Figure 3:
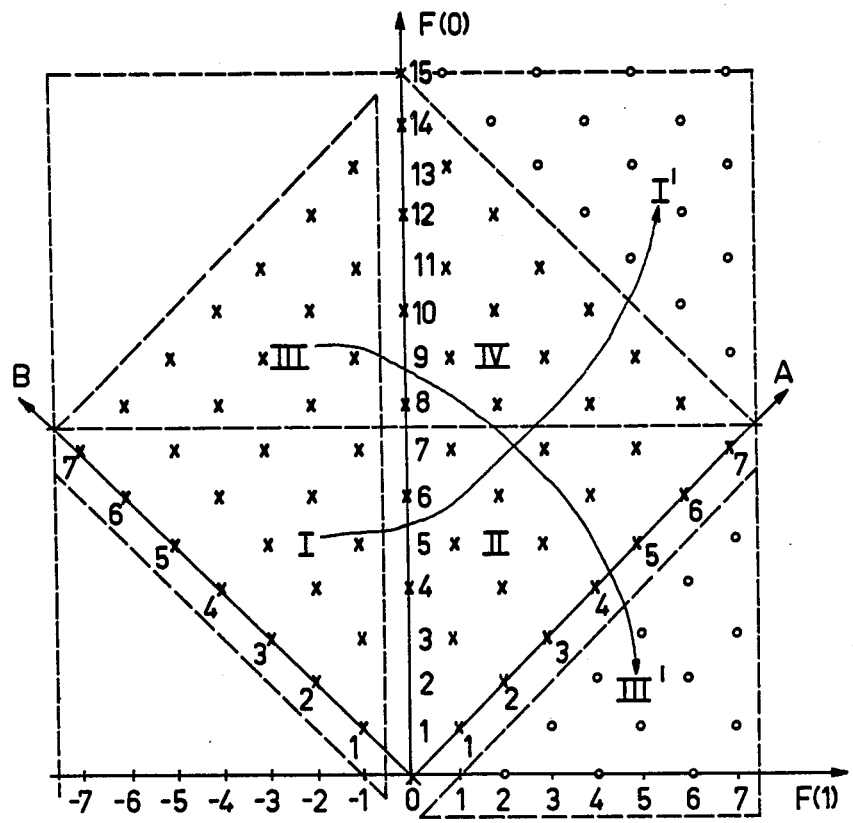
FIG. 3 shows schematically mapping of portions of the value range of the output values on a different value range.

In the arrangement shown in FIG. 1, the picture element signals applied via the conductor 1 are transformed in the transformation arrangement 2 in accordance with the desired transformation algorithm and under the control of the control unit 6; that is to say they are converted into coefficients which are applied by the conductor 3 to the quantizing device 4, which is also controlled by the control unit 6. The quantized coefficients are applied to the transmission path 10. Instead of being applied to the transmission path they may alternatively be applied to a store.

The coefficients are applied to a decoder 14 and decoded therein. The decoded coefficients are applied to the retransformation arrangement 12 via the conductor 13, so that predominantly the original picture element signals applied to the input 1 appear at the output 15.

The control of the decoder 14 and of the retransformation arrangement 12 is effected by the control unit 16.

The general construction of a transformation arrangement 2, a quantizing device 4, a decoder 14 and a retransformation arrangement 12 is known in principle.

For the further description, the mathematical background will first be described, more specifically on the basis of a Walsh-Hadamard-transformation. A 2-point-transformation of two picture elements A and B are effected as the basic step:

$$\begin{bmatrix} F(1) \\ F(2) \end{bmatrix} = H_2 \begin{bmatrix} A \\ B \end{bmatrix} \tag{1}$$

wherein $$H_2 = \begin{bmatrix} 1 & 1 \\ 1 & -1 \end{bmatrix} \tag{2}$$

The resultant coefficients are thus defined by the expressions $$F(0) = A + B$$

$$F(1) = A - B \tag{3}$$

These coefficients can easily be determined by means of conventional arithmetical means.

A Wash-Hadamard-transformation for a complete picture or a sub-picture of $2n (n = 2^N, N = 1, 2, \ldots)$ picture elements can be derived step-wise from the above-indicated basic step in the following manner.

$$H_{2n} = \begin{bmatrix} H_n & H_n \\ H_n & -H_n \end{bmatrix} \tag{4}$$

So two coefficients always formed from different basic transformation steps are further processed with such a basic transformation step until finally all picture elements of said picture or sub-picture have been considered. Thus the transformation is effected in a plurality of steps.

An arrangement for performing such a Walsh-Hadamard-transformation is shown in FIG. 2. Of the signals applied to the input 21, every second signal is temporarily stored in the intermediate store 24, so that two consecutive signal values are available at the output of the arithmetical unit 22. When the Walsh-Hadamard-transformation is used, the arithmetical unit 22 forms each time the sum and the difference of these two values and applies the result to the correspondingly designated outputs 23 and 25. These output values correspond to the coefficients F(0) and F(1) of the formula (3) and shown in FIG. 2.

Every first value of the output values at the output 23 is temporarily stored in the intermediate store 28 and thereafter applied to one input of the arithmetical unit 26, while the second output value is directly applied from the output 23 to the other input of the arithmetical unit 26. The corresponding operation is also effected on the output values at the output 25, each first value of which is temporarily stored in the store 32 and then applied together with the second value in parallel to the arithmetical unit 30. The arithmetical units 26 and 30 have absolutely the same construction as the arithmetical unit 22, which also applies to the subsequent arithmetical units 34, 38, 42 and 46.

Output values which correspond to the coefficient of a sub-picture consisting of 2×2 picture elements are then produced at the outputs of the arithmetical units 26 and 30. Also these output values are alternately applied, via the intermediate stores 36, 40, 44 or 48 and directly, to the calculating units 34, 38, 42 and 46. These arithmetical units produce at the outputs the coefficients F''(0), F''(1) . . . of a sub-picture consisting of 4×2 picture elements.

This arrangement can be extended at option, so that correspondingly larger sub-pictures are transformed.

In order to prevent a doubling of the value range of the output values compared with the value range of the input values from occurring in each arithmetical unit or at each stage of the processing operation, respectively, a different mapping of the output values is now effected, as will be further explained with reference to FIG. 3. The slanting coordinates A and B denote the possible input values of an arithmetical unit. The Walsh-Hadamard coefficients F(0) and F(1) formed therefrom are shown in the systems of coordinates. From this it can be seen that the coefficients F(0) and F(1) each have a value range of 2G if the value range of the applied signals A and B is equal to G. The value range is extended because of the fact that at the summation a carry bit and at the difference formation a sign bit may occur. On the other hand FIG. 3 also shows that the value combinations, denoted by means of crosses, of the coefficients F(0) and F(1), do not encompass all the possible value combinations of these coefficients within their full value range. This means that the coefficients have a redundancy produced by the transformation itself. This redundancy can be further determined as follows. From the formula (3) it follows that the coefficients F(0) and F(1) are both either even or odd. Upon binary notation of these values the least significant bits are equal to each other, so that in this respect only one coefficient must be taken into account.

FIG. 3 further shows that the value combinations (denoted by crosses) of the coefficients F(0) and F(1) are defined by an uncertainty principle of the following shape:

$$[F(0) - G] + [F(1)] \leq G \tag{5}$$

This relation indicates that the actually occurring value combinations, denoted by crosses, of coefficients F(0) and F(1) occur in an area formed by a tilted square, so that the areas in the corners are not occupied by the dashed-line outersquare which includes the total number of value combinations, so that the total number of value combinations cover an area which is twice as large as the area of the actually occurring value combinations of the coefficients F(0) and F(1).

The restriction (both even or both odd) of the value combinations of the two coefficients cannot be used to form coefficients whose value range has not become larger compared with the value range of the applied input values A and B. For that purpose at least a portion of the coefficients first formed is mapped in another area of the field shown in FIG. 3. Several mappings are possible. Each of these mappings is based on a division of the original field, shown in FIG. 3, into four areas I, II, III and IV, which are determined by the carry bit of the sum coefficient F(0) and by the sign bit of the difference coefficient F(1). This is based on the assumption that the representation of the difference A−B for the difference coefficient F(1) is performed in the two's complement, so that $$F(1) = A - B + G \qquad (6)$$

wherein G represents the number of values of the variables A and B, respectively.

As a result thereof positive differences are represented by a bit having the value "1" in the position of the most significant bit, which is denoted as the sign bit VZ, and negative differences include a bit having the value "0" in the position of the most significant bit. In the sum coefficient F(0) the most significant bit indicates the carry bit U. By combining the carry bit U and the sign bit VZ of the coefficients F(0) and F(1) different mappings can be realized, so that the total value range to be represented of the two coefficients together is halved. By making additional use of the property that the two coefficients are odd or even, modified coefficients can be obtained whose value range is equal to the value range of the applied signals A and B. With such a mapping no loss of information occurs, so that by a corresponding retransformation the picture element can be accurately reconstructed.

FIG. 3 shows a mapping method in which the area I is moved to the right above (K') the area IV and the area III is moved to the right below (III') the area II. So, the modified coefficients F*(0) and F*(1) thus obtained are formed in accordance with the following Table 1, the difference values being shown in two's complement.

TABLE 1

|     | F (0)  | F (1)   | U + VZ | F* (0)      | F* (1)      |
|-----|--------|---------|--------|-------------|-------------|
| I   | U = 0  | VZ = 0  | 1      | A + B + 2⁴  | A − B + 2⁴  |
| II  | U = 0  | VZ = 1  | 0      | A + B       | A − B       |
| III | U = 1  | VZ = 0  | 0      | A + B − 2⁴  | A − B + 2⁴  |
| IV  | U = 1  | VZ = 1  | 1      | A + B       | A − B       |

This is based on the assumption that $G = 2^4 = 16$. So the shift of the areas can be formed by an exclusive-NOR-gate to which the carry bit U and the sign bit VZ are applied.

Figures 4A, 4B:
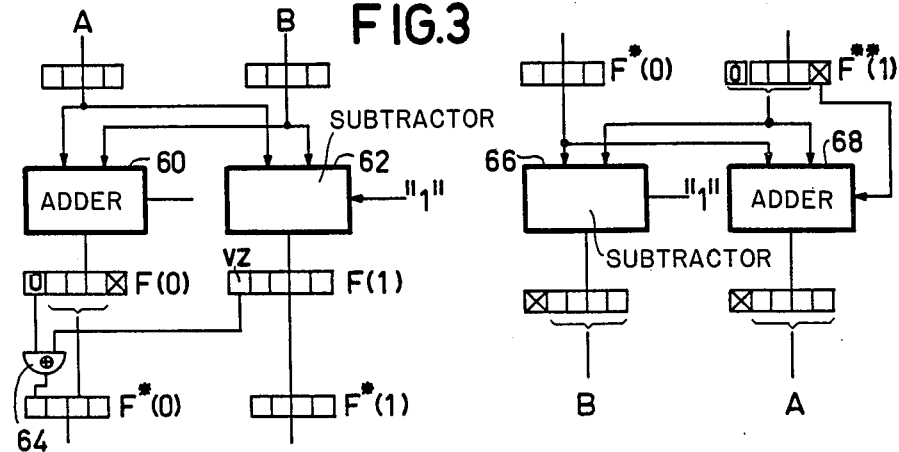
FIG. 4a shows an auxiliary transformer provided with the measures in accordance with the invention for use in a transformation arrangement.
FIG. 4b shows an auxiliary transformer provided with the measures in accordance with the invention for use in a retransformation arrangement.

A circuit arrangement, which realizes such a mapping of the coefficient and can be used for each arithmetical unit 22, 26, 30 etc. of FIG. 2, is shown in FIG. 4a. The two signals A and B occur in the form of binary four-bit-words, which is shown by the block with four boxes in the signal path. These two signals are applied to both an adder unit 60 and a subtracting unit 62, a carry signal having the value "1" being continuously applied in order to obtain the corresponding difference in two's complement. The output values of the two units 60 and 62 represent the coefficients F(0) and F(1), which are represented by five-bit binary words. For the coefficient F(0) the bit U in the position of the most significant bit indicates the carry bit and for the coefficient F(1) the bit VZ in the position of the most significant bit indicates the sign bit.

These two bits are now applied to the inputs of an exclusive-NOR-gate 64, and the output signal of this gate replaces the carry bit U of the coefficient F(0). In addition, the least significant bit (denoted by means of a cross) of this coefficient is omitted, since the corresponding bit of the other coefficient F(1) has the same value. This results in the modified coefficient F*(0), which has a length of only four bits, that is to say it contains the same number of information units as the applied signals A and B. The sign bit is not further used at the coefficient F(1) as it is already indirectly present in the most significant bit of the modified coefficient F*(0). The last four bits of F(1) now represent the modified coefficient F*(1). As a result thereof, also this coefficient has the same number of information-units as the applied signals A and B. All together this results in the coefficients F*(0) and F*(1) in accordance with Table 1, which comprise the same number of information bits as the applied signals A and B. So when the arithmetical units 22, 26, 30 etc. of FIG. 2 are realized by an arrangement shown in FIG. 4a, it will be obvious that also in the event of a longer cascade arrangement of arithmetical units for the transformation of a larger sub-picture the word length of the coefficients is not increased.

The re-transformation unit 12 in FIG. 1 is of approximately the same construction as the transformation unit 12, the two units even being identical when the Walsh-Hadamard transformation is employed. So the step-wise processing of each time two coefficients restores the original picture data again. When the modified coefficients, which are produced by the arrangement shown in FIG. 4a are used, a modified retransformation is, however, also necessary. First the mathematical background of the retransformation of the modified coefficients will be described. When the Walsh-Hadamard-transformation is employed also now the sum and the difference of the two coefficients are formed. Taking account of the modified coefficients there is now obtained for the retransformed values A and B, which here consequently do not directly represent the retransformed picture signals but resulting values, the calculation shown in the following Table 2.

TABLE 2

|           | A                                                            | B                                                              |
|-----------|--------------------------------------------------------------|----------------------------------------------------------------|
| Area I:   | ½ · (A + B + 2⁴)<br>+ ½ · (A − B + 2⁴)                       | ½(A + B + 2⁴)<br>− ½(A − B + 2⁴) + 2⁴                          |
|           | A + 2⁴                                                       | B + 2⁴                                                         |
| Area II + IV: | ½(A + B)<br>+ ½(A − B)                                   | ½(A + B)<br>− ½(A − B) + 2⁴                                    |
|           | A                                                            | B + 2⁴                                                         |
| Area III: | ½(A + B − 2⁴)<br>+ ½(A − B + 2⁴)                             | ½(A + B − 2⁴)<br>− ½(A − B + 2⁴) + 2⁴                          |
|           | A                                                            | B                                                              |

The values which may be combined in the individual areas can be obtained from Table 1. The factor ½ is obtained at the sum coefficient F*(0) because of the fact that the least significant bit has been omitted. The factor ½ is also obtained at the difference coefficient F*(1) because of the fact that the least significant bit is processed separately and differently from the other bits, as will be further described hereinafter with reference to an embodiment.

Table 2 shows that with this retransformation, the subtraction in the two's complement being again equal to the addition of the value 2⁴ to the difference, the original values A and B are directly recovered, only with coefficients of defined areas in accordance with FIG. 3 a carry in the form of the term 2⁴ occurring, which can therefore be simply eliminated by limiting the output values to the last four bits of the information words produced during the processing operation.

FIG. 4b shows such an arithmetical unit. Also this unit comprises an adder unit 68 and a subtracting unit 66, to which two decoded coefficients F*(0) and F(1) are applied in parallel. The coefficient F(1) is obtained from the coefficient F*(1), because the latter is extended with one bit in the most significant position, this additional bit having the value "0". The four most significant bits of the coefficient F**(1) are applied together with the four bits of the coefficient F*(0) to both the subtracting unit 66 and the adder unit 68, the coefficient F*(0) receiving the last significant bit of the coefficient F**(1) by way of carry bit, while the subtracting unit 66 continuously receives a signal having the value "1" by way of carry-bit.

Of the output signals of the units 66 and 68 the most significant bit is not further processed, as the four lowest bits directly indicate the required value, as has already been described with reference to the Table 2. So in this manner it is possible to avoid an increase of the word length also during the retransformation, it only being necessary for the two units 66 and 68 to process the number of bits which also comprise the applied modified coefficient.

As a complete Walsh-Hadamard transform to a larger number of picture elements in accordance with the formula (4) can be derived step-by-step from the two point transformation, each output value may be used for the retransformation as the modified coefficient of the subsequent stage and can further be processed in exactly the same way. Consequently, both during the transformation and the retransformation exceeding the word length is avoided, so that each arithmetical unit need only to be constructed for the shortest possible word length.

What is claimed is:

1. An arrangement for coding and decoding picture element signals comprising a coding arrangement, the picture element signals being obtained by line by line scanning of the picture elements of a picture, said picture element signals being transformed in a transformation arrangement for generating coefficient values which are quantized in a quantizing device, also comprising a decoding arrangement in which the quantized coefficients are reconverted in a retransformation arrangement into picture element signals which correspond to a very high extent to the original picture element signals, the transformation arrangement and the retransformation arrangement each being formed by a plurality of transformers $T(i)$ of the order $i$, wherein $i = 1, 2, 3, \ldots N$ and the transformer $T(i)$ having $i$ inputs and $2i$ outputs, the $i$ inputs being connected to the $i$ outputs of a preceding transformer $T(i-1)$, each transformer being formed by $i$ auxiliary transformers each having an input connected to the associated output of the preceding transformer $T(i-1)$, an arithmetical unit having two inputs one of which is connected directly and the other one via a delay device to the input of the auxiliary transformer, the arithmetical unit having two outputs which represent two of the outputs of the transformers $T(i)$, characterized in that each auxiliary transformer of the transformation arrangement comprises at least one additional logic circuit to which the carry bit of a first of the two output values and the sign bit of the second output value of the calculating unit are applied for generating an auxiliary bit which by way of most significant bit in the first output value replaces the carry bit while the least significant bit of this first output value and the sign bit of the second output value are suppressed and that each auxiliary transformer of the retransformation arrangement comprises a modifying circuit for adding a bit having the value "0" to the second output value in a bit position whose significance is higher than that of the most significant bit of the original second output value and for suppressing the least significant bit of the second output value thus modified and for applying this suppressed least significant bit together with the modified second output value to an adder device by way of carry bit.

* * * * *